(12) United States Patent
Boezeman et al.

(10) Patent No.: US 6,184,895 B1
(45) Date of Patent: Feb. 6, 2001

(54) METHOD AND SYSTEM FOR USING COLOR INFORMATION TO CREATE SPECIAL EFFECTS

(75) Inventors: John Junior Boezeman, Cary; Randall Peter Eckhoff, Apex; Dennis Donald King, Cary, all of NC (US)

(73) Assignee: International Business Machines Corp., Armonk, NY (US)

( * ) Notice: Under 35 U.S.C. 154(b), the term of this patent shall be extended for 0 days.

(21) Appl. No.: 08/792,595

(22) Filed: Jan. 31, 1997

(51) Int. Cl.[7] ................................................... G06T 11/40
(52) U.S. Cl. ............................................................. 345/431
(58) Field of Search ................................. 345/431, 425, 345/430

(56) References Cited

U.S. PATENT DOCUMENTS

| | | | |
|---|---|---|---|
| 4,958,272 | * 9/1990 | Wake ...................................... | 345/431 |
| 5,384,901 | * 1/1995 | Glassner et al. ....................... | 345/431 |
| 5,615,320 | * 3/1997 | Lavendel ............................... | 345/431 |
| 5,757,374 | * 5/1998 | Nakamura et al. .................... | 345/425 |
| 5,808,624 | * 9/1998 | Ikedo ..................................... | 345/435 |
| 5,818,454 | * 10/1998 | Arai et al. ............................. | 345/431 |
| 5,847,712 | * 12/1998 | Salesin et al. ........................ | 345/430 |
| 5,898,436 | * 4/1999 | Stewart et al. ........................ | 345/431 |
| 5,909,220 | * 6/1999 | Sandow ................................. | 345/431 |

\* cited by examiner

Primary Examiner—Mark R. Powell
Assistant Examiner—Hue Dung X. Cao
(74) Attorney, Agent, or Firm—A. Bruce Clay; Myers, Bigel, Sibley & Sajovec, P.A.

(57) ABSTRACT

An authoring tool is enabled to create special effects on an image using a color scale. A pattern file is used to map the image to the desired effect. By assigning meaning to one or more of the colors in the color scale, an image will be produced in accordance with the pattern file and the selected colors.

19 Claims, 5 Drawing Sheets

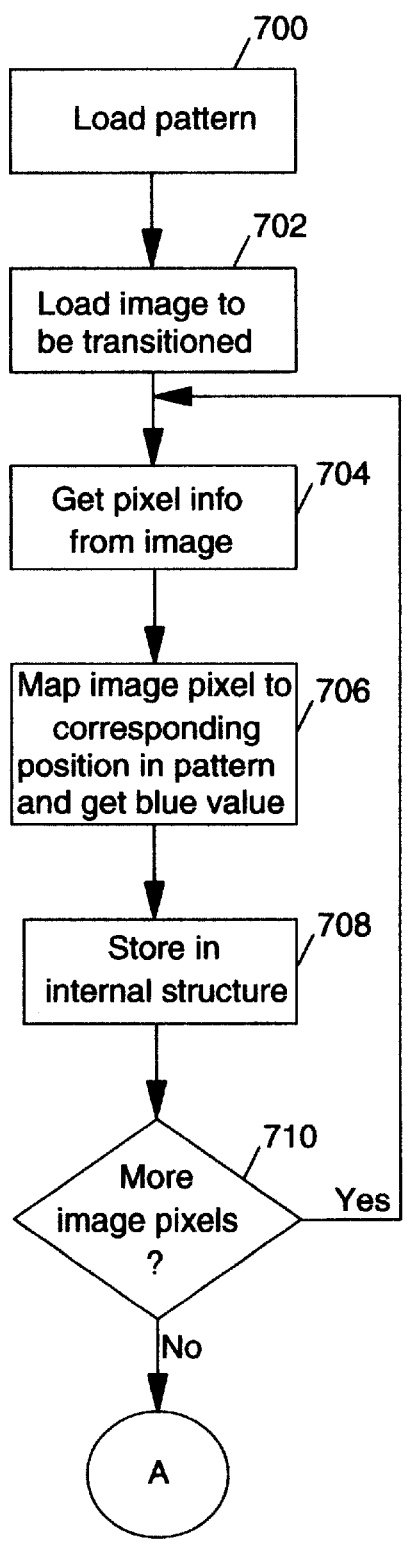
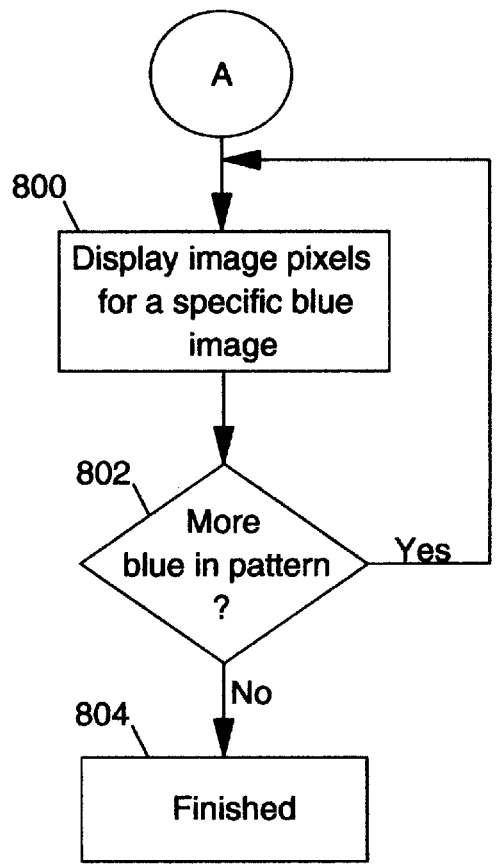
FIG. 7
FIG. 8

METHOD AND SYSTEM FOR USING COLOR INFORMATION TO CREATE SPECIAL EFFECTS

FIELD OF THE INVENTION

This invention relates in general to computer software, and in particular to a method and system for using color information in a file to perform special effects on an image.

BACKGROUND OF THE INVENTION

In the current world of advertising, movies and television, special effects can make or break a product. Computers are being used more and more all the time to create special effects, and users, as well as viewers, are becoming more discriminatory in what they will accept when it comes to what they see and create.

Computer authoring tools are one way users can add special effects to images. Special effects may include a fade in or fade out and a wipe right, etc. The currently available authoring tools have a rather inflexible approach to the creation of special effects due inherently to the methods used to draw an image.

For example, authoring tools like Director by Macromedia, Premiere by Adobe and Freelance Graphics by Lotus Development Corp. only support a limited number of pre-programmed transitions/dissolves. These tools typically use either an algorithm or a table to make transitions/effects. These limited number of effects are coded into the product's tools, and the user is unable to create any others.

The tools that use an algorithm are hard pressed to do anything beyond a simple transition. For example, if the user wants an image to transition into view by way of several spirals and a star, the math for computing such a display is both time consuming and complex. The level of complexity increases as any other characteristic, such as opacity, is added to when the image pixel is to become visible.

The tools that use a table method require a fixed table specifying when each image pixel is to become visible. Additional tables must be added for each and every other characteristic the user wants the image to display. These tables must be prepared and stored in the program for use when a transition is desired.

Thus, there is a need for a simple to use method and system for adding user defined transition patterns to create special effects.

SUMMARY OF THE INVENTION

The present invention disclosed herein comprises a method and system for using color to create special effects on an image which eliminates problems associated with prior special effect methods. The present invention allows the use of a color scale to produce any desired effect on an image.

In accordance with one aspect of the invention, a method is provided for creating on a computer system special effects on an image using color information. A color is associated with an effects property defined by a pattern file. An image is then mapped to the pattern file. The image is displayed on the computer system in accordance with the effects property, as applied by the pattern file.

It is a technical advantage of the present invention that special effects may be created by a user in any desired fashion. By assigning any known characteristic or effect to a color, the user can produce a special effect on an image in whatever fashion their imagination can devise.

BRIEF DESCRIPTION OF THE DRAWINGS

For a more complete understanding of the present invention and for further advantages thereof, reference is now made to the following Detailed Description taken in conjunction with the accompanying drawings, in which:

FIGS. 7 and 8 are high level flowcharts illustrating the present invention.

DETAILED DESCRIPTION OF THE INVENTION

Figure 1:
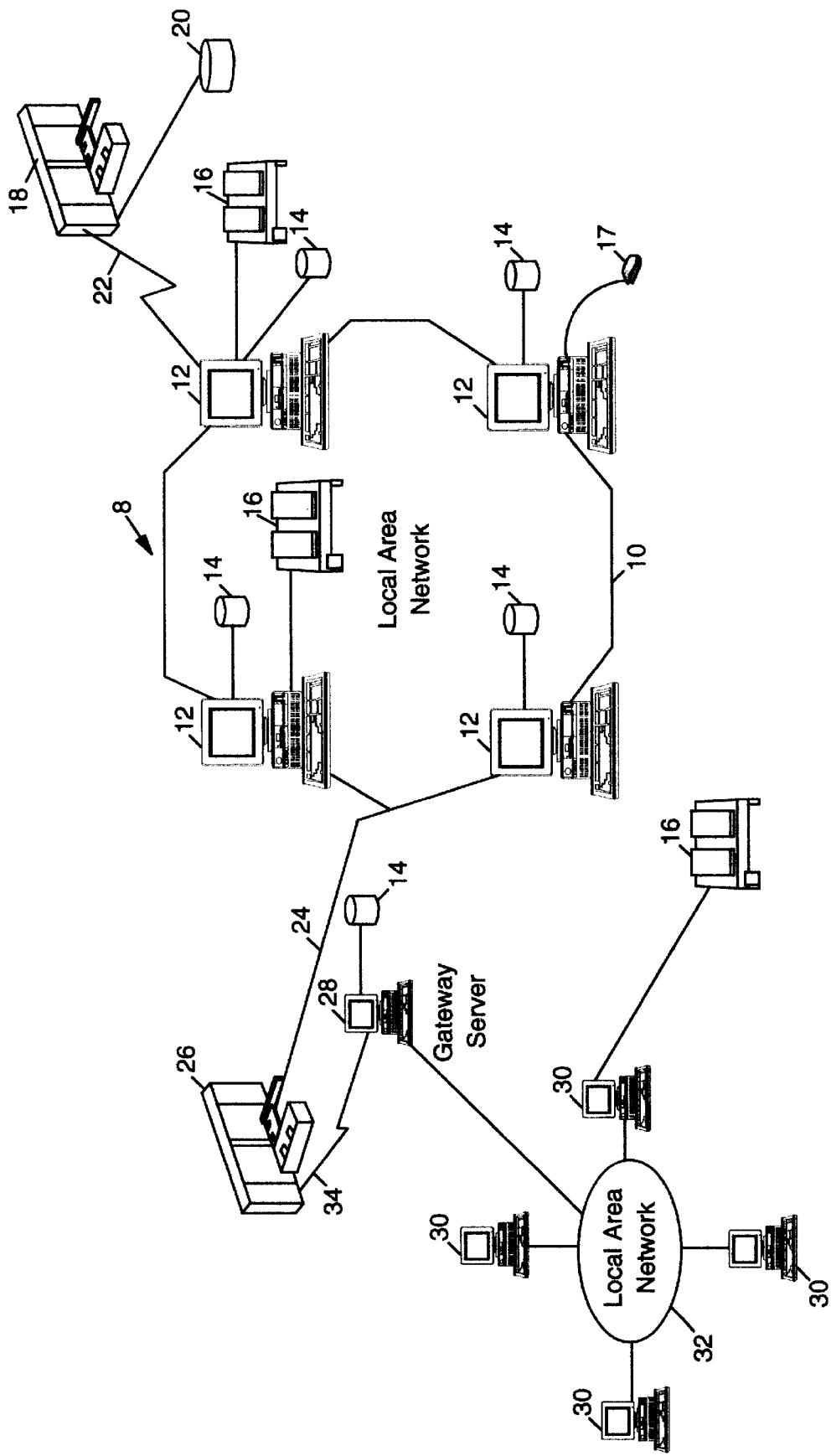
FIG. 1 is a pictorial representation of a data processing system which may be utilized to implement a method and system of the present invention.

Referring to FIG. 1, there is depicted a graphical representation of a data processing system 8, which may utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects maybe stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

The present invention utilizes a well known color mixing model such as RGB (for red, green, blue). Each color has 256 shades starting with the darkest shade as value 0 and progressing to the brightest shade as value 255. To obtain the desired color, RGB mixes the appropriate shade value of each RGB. By selecting one of the colors and all of its associated shades while deselecting all of the other shades of the other two colors, the present invention can present an image by starting with all image pixels that fall into a pattern comprising various shade values for that selected color. For example, the present invention is described as selecting only blue and deselecting red and green. Thus, a pattern such as, for example, a progressively larger circle, can have a center made up of blue values of 0 (darkest) and blue values gradually increasing outwardly to 255. Then, by mapping an image to the pattern and assigning each image pixel a blue value corresponding to where it appears on the pattern, the image may be made to appear gradually by painting the lowest value to the highest value.

It is also to be understood that the present invention contemplates a wide variety of the use of color in the RGB scale or any other color scale, such as CYMK (cyan, yellow, magenta and black). For example, the red scale and the green scale can be used to determine other effects on the pixels. Red can be used to determine opacity while green can be used to transform (i.e., move such as rotate) the pixel. Thus, in conjunction with the blue to determine when each image pixel is displayed, the red component of the pattern could determine how intense the image pixel is painted and the green could cause the image to rotate.

It is to be understood that the color pattern chosen for demonstration purposes herein could be easily rearranged in any fashion. For example, blue could be used for opacity and red for when a pixel may appear. Also, going from a 0 value of a color to the 255 value is arbitrary and could just as easily go from 255 to 0 or some other variation thereof. Likewise, any other functionality can be assigned to any of the colors. For example, red could be used to represent an arc tangent function, green could be used to represent a sine function and blue could be used to represent a cosine function.

Figure 4:
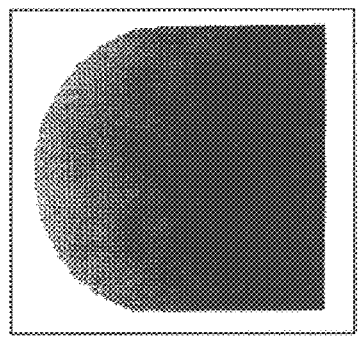
FIG. 4 is a sample of a pattern file for use with the present invention.

In order to illustrate the present invention, an example is herein described using the RGB color scale with blue values from 0 to 255 while green and red have no values. A star image is to appear gradually from the right to the left (a wipe left effect) using a circle pattern (darkest blue, value 0, in the center of the circle and gradually brighter blue concentrically outward, see FIGS. 4 and 6) file.

Figure 2:
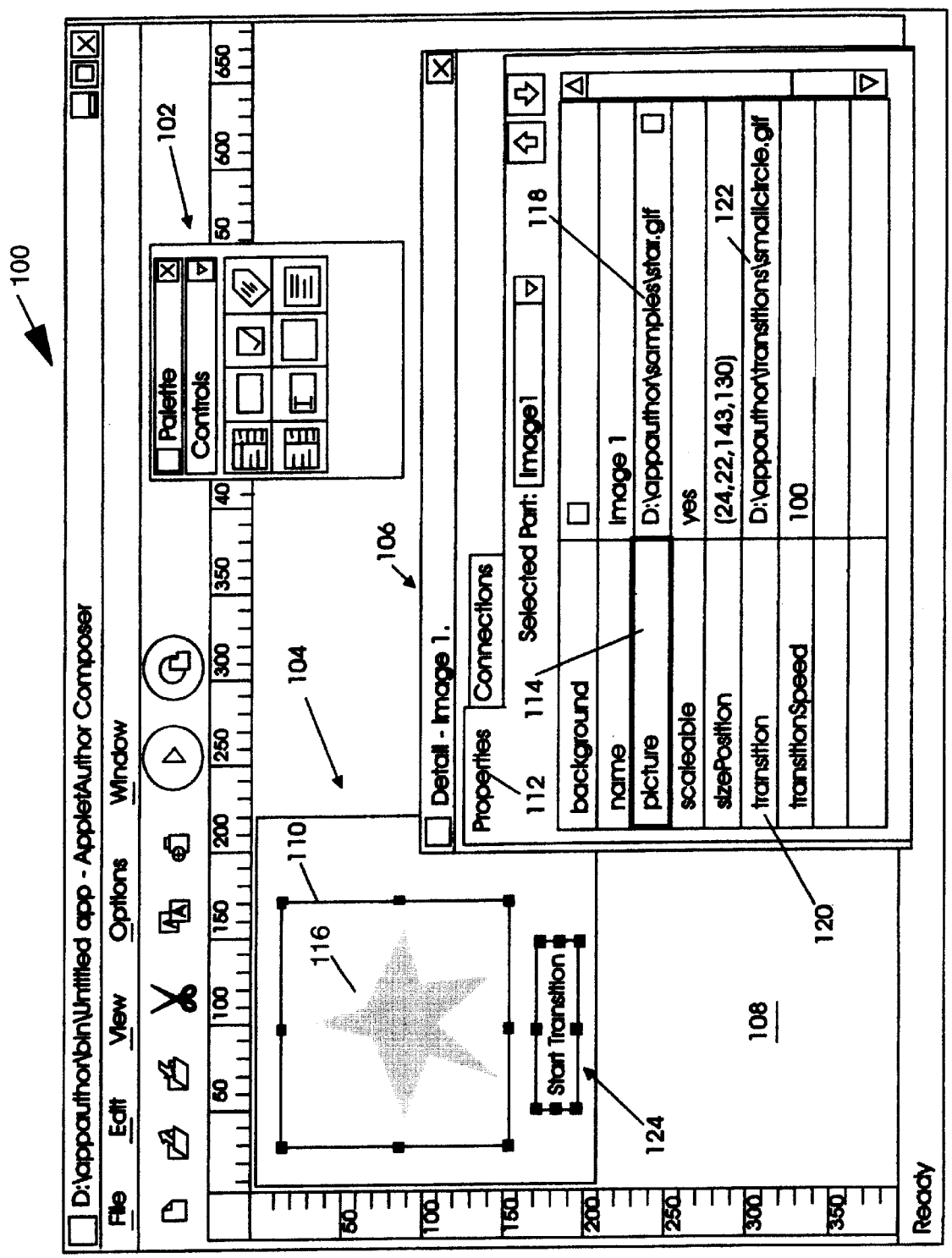
FIG. 2 is a graphical representation of an editor which may be used to implement the present invention.

Referring to FIG. 2, a graphical representation of a special effects editor such as, for example, AppletAuthor Composer from IBM Corp., for use with the present invention is generally identified by the reference numeral 100. Upon opening the editor 100, a Palette 102, an empty (although already filled in by subsequent steps, this panel is initially empty) image panel 104 and a Details panel 106 are surfaced on a work area 108 thereof.

A user then selects an image part 110 from the palette 102 and a drags-and-drops the part 110 (the image part 110 at this point comprises a border with handles only) therefrom onto the image panel 104. The user must now set properties for the image and the desired effect by selecting the Properties tab 112 in the Details panel 106. By selecting "picture" 114, a listing of files that comprise available images will pop-up (not shown). The user has decided, for example, to display a star 116 (as shown in the image panel 104) with the desired special effect. By choosing the appropriate file from the pop-up, the file name (for example, D:\appauthor\samples\star.gif) appears in the field 118 adjacent to picture 114. It is to be understood that the listing of available images may be created by any appropriate method such as scanning a photograph, transfer from an image editor, etc.

The user then selects "transition" 120 from the Details panel 106 which surfaces a pattern file dialogue (not shown). The user selects the desired special effect pattern from the dialogue which is entered into field 122 (for example, D:\appauthor\transitions\smallcircle.gif). Again, for example, the user has selected a wipe-in starting from the right based on a small circle (see FIG. 4), which will be subsequently described in greater detail. It is to be understood that the pattern file may be created using any image editor such as, for example, Photoshop from Adobe. The remaining properties may then be selected or, alternatively, the default values may be accepted. The user must then return to the Palette 102 and select a control, for example, Start Transition push-button 124, which is dragged-and-dropped into the image panel 104.

Figure 3:
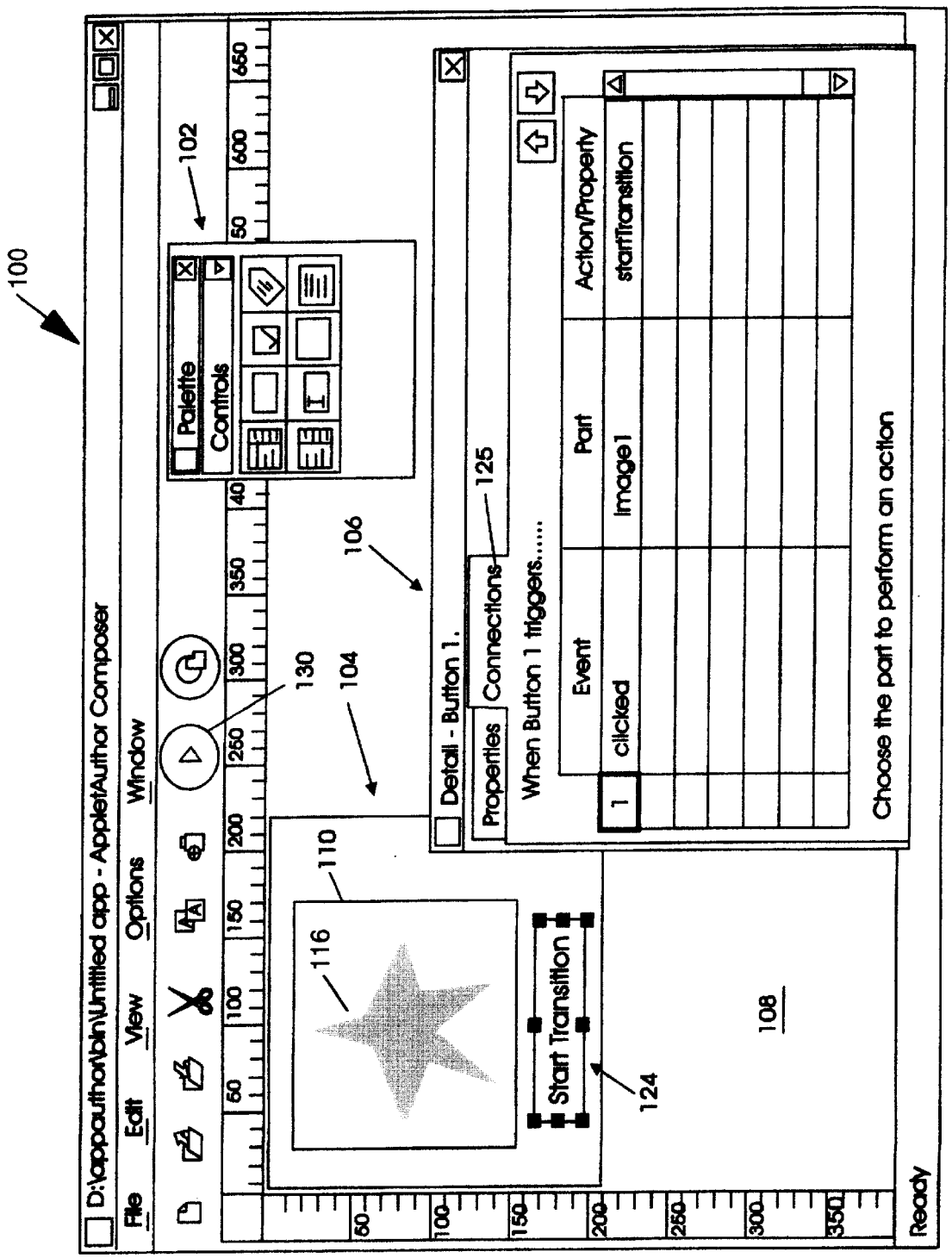
FIG. 3 is a graphical representation of the use of the editor of FIG. 3 in accordance with the present invention.

Referring next to FIG. 3, the user has selected the "Connections" tab 125 in the Details panel 106. The appropriate options are entered to make the connections, for example, when the push-button 124 is clicked, start the transition for Image1 (i.e., start the wipe-in of the star from the right to the left). A "Run the Applet" button 130 is then selected, and the Java class (or only other programming language code) is compiled.

Figure 5A:
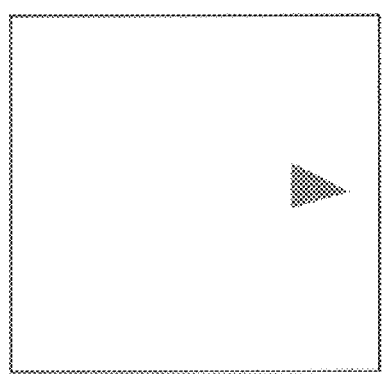
FIGS. 5A, 5B, 5C and 5D illustrate a fade-in using the method of the present invention.
Figure 5B:
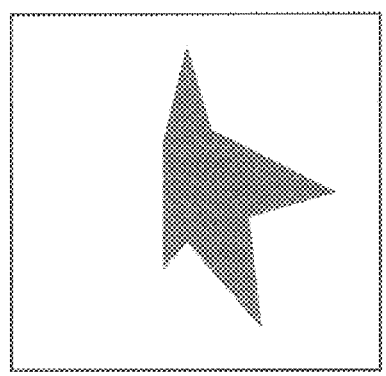
Figure 5C:
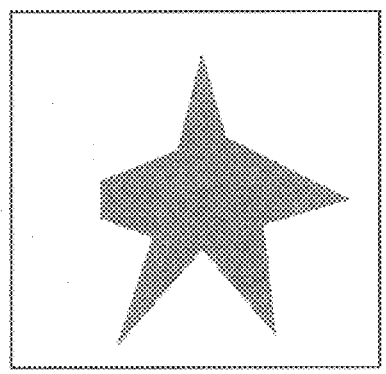
Figure 5D:
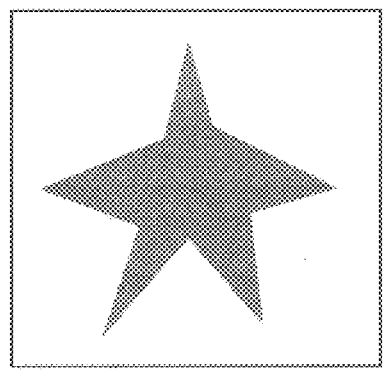

A preview window 200 (see FIGS. 5A, 5B, 5C and 5D) then appears in order to allow the user to preview the selected effect on the selected image. For example, FIG. 5A shows the right-most portion of the star beginning to appear. FIG. 5B–5D show progressively more of the star image from the right to the left until the entire image appears. Thus, the star appears as a wipe-in from the right to the left.

Figure 6:
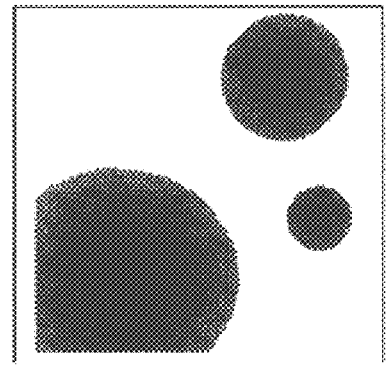
FIG. 6 illustrates an example of a more complex pattern file that may be used to implement special effects in accordance with the present invention.

Referring to FIG. 6, a more complex example utilizing the present invention is shown. The present invention will allow the user to select the number and type of effects on any image down to and including the selection of how and when each individual image pixel will appear. In FIG. 6, the user has selected three progressively smaller circle patterns for the effect on whatever image is being used. Following the above example, this would mean that the portion of the image coincident with the centers of each circle would appear simultaneously and the image would gradually appear outward from the three centers until the whole image is visible.

Referring to FIGS. 7 and 8, a high level flowchart illustrates the present invention. Referring first to FIG. 7, the pattern (i.e., the effect) is first loaded at block 700. At block 702, the image to be transitioned is loaded. Then, at block 704, the present invention begins to obtain pixel information from the image starting with the upper left hand pixel (moving left to right and top to bottom with each iteration).

The pixel image is then mapped at block 706 to the corresponding position in the pattern file and a "Blue" value is obtained therefor. The position, blue value and image pixel information is stored in internal structure at block 708. It is then determined at decision block 710 whether or not there are more image pixels.

If the response to decision block 710 is yes, the present invention returns to block 704 for the next pixel. If the response to decision block 710 is no, the present invention proceeds to A in FIG. 8. All image pixels corresponding to a specific blue value (for example, starting with 0 (the darkest) and moving up to 255 (the brightest)) are displayed at block 800. It is determined at decision block 802 whether or not there are more blue values in the pattern. If the response to decision block 802 is yes, the next higher blue value is displayed at block 800. If the response to decision block 802 is no, the present invention is finished at block 804.

It is important to understand that the image and the pattern do not need to be dimensionally identical. Mapping as used herein includes the use of relative position in the pattern file and the image file to determine the value of the effect on the image pixel. Standard algebraic ratios are used along with standard rounding techniques to determine the image pixel position in the pattern file which then determines the amount of the effect applied to the pixel based on the color value at that pattern file position. For example, a 100×100 pixel image is being mapped to a 10×10 pixel pattern file. The center pixel of the image (50,50) is mapped to position 5,5 in the pattern file (50/100=x/10; x=5).

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of creating images having special effect properties on a computer system having a display device, the method comprising the steps of:
    selecting a special effect pattern which is to be applied to an image;
    selecting the image on which the special effect pattern will be applied;
    mapping the image to the pattern file; and
    displaying the image on the computer system in accordance with the pattern file so as to display the image with the special effect property;
    wherein the special effect pattern is defined by a pattern file that comprises an array of values;
    wherein each value in the array of values represents a particular intensity of a selected color that is associated with a specific location in the pattern; and
    wherein the selected color is associated with a type of special effect property.

2. The method of claim 1, wherein the displaying step comprises the step of displaying the image on the display device of the computer system by displaying, over time, portions of the image which map to particular intensity values in the pattern file so as to make the imaoe gradually appear on the display device.

3. The method of claim 1, wherein said mapping step comprises the steps of:
    displaying the image on the display device;
    displaying the special effect pattern on the display device;
    overlaying the displayed image and the displayed special effect pattern on the display device; and
    mapping the image to the pattern file by mapping the color intensity value associated with specific pixels on the displayed special effects pattern to corresponding pixels on the displayed image.

4. The method of claim 3, wherein said displaying step comprises the step of sequentially illuminating a series of subsets of the pixels associated with the image, wherein pixels which have the same mapped color intensity value are included in the same subset.

5. The method of claim 3, wherein said displaying step comprises the step of illuminating each pixel associated with the image in proportion to its mapped color intensity value.

6. The method of claim 3, wherein said displaying step comprises the step of displaying the image on the display device in accordance with the pattern file so as to perform a translational special effect on the image.

7. The method of claim 1, wherein said mapping step further comprises the step of mapping a position of an image pixel to a relative position in the pattern file using algebraic ratio and rounding techniques.

8. The method of claim 1, further comprising the step of applying a second special effect pattern to the image by:
    selecting a second special effect pattern which is to be applied to the image, wherein the second special effect pattern is defined by a second pattern file that uses color to specify the pattern;
    mapping the image to the second pattern file; and
    displaying the image on the computer system in accordance with the first and second pattern files so as to display the image with the special effect properties.

9. A system for creating images having special effect properties on a computer system having a display device, the system comprising:
    an image selection window displayed on the display device that allows a user to select an image on which a special effect may be implemented from a plurality of images;
    a plurality of pattern files that use color to define a special effect pattern, wherein each pattern file comprises an array of values and wherein each value in the array of values represents a particular intensity of a selected color that is associated with a specific location in the pattern;
    a special effect pattern window displayed on the display device that allows the user to select from the plurality of special effect patterns the special effect pattern which is to be applied to the selected image;
    a processor configured to map the selected image to the pattern file associated with the selected special effect pattern; and
    means for displaying the image on the computer system in accordance with the pattern file so as to display the image with the special effect property.

10. The system of claim 9, further comprising a display window for displaying a selected special effect pattern on the display device.

11. The system of claim 9, wherein each of the plurality of pattern files comprises an array of values which assign a particular intensity of a selected color to specific locations in the pattern.

12. A system for creating images having special effect properties on a computer system having a display device, the system comprising:
    means for selecting a special effect pattern which is to be applied to an image;
    means for selecting the image on which the special effect pattern will be applied;
    means for mapping the image to the pattern file; and
    means for displaying the image on the computer system in accordance with the pattern file so as to display the image with the special effect property;

wherein the special effect pattern is defined by a pattern file that comprises an array of values;

wherein each value in the array of values represents a particular intensity of a selected color that is associated with a specific location in the pattern; and wherein the selected color is associated with a type of special effect property.

13. The system of claim 12, wherein the pattern file comprises an array of values, wherein each value in the array assigns a particular intensity of a selected color to a specific location in the pattern.

14. The system of claim 13, further comprising means for displaying the special effect pattern on the display device by illuminating a portion of the display device in accordance with the intensity values stored in the pattern file.

15. The system of claim 13, wherein said means for mapping comprises:

means for displaying the image on the display device;

means for displaying the special effect pattern on the display device;

means for overlaying the displayed image and the displayed special effect pattern on the display device; and means for mapping the image to the pattern file by mapping the color intensity value associated with specific pixels on the displayed special effects pattern to corresponding pixels on the displayed image.

16. A computer program product recorded on a computer readable medium for creating images having special effect properties on a computer system having a display device, comprising:

computer readable program code which selects a special effect pattern which is to be applied to an image;

computer readable program code which selects the image on which the special effect pattern will be applied;

computer readable program code which maps the image to the pattern file; and computer readable program code which displays the image on the computer system in accordance with the pattern file so as to display the image with the special effect property;

wherein the special effect pattern is defined by a pattern file that comprises an array of values;

wherein each value in the array of values represents a particular intensity of a selected color that is associated with a specific location in the pattern; and wherein the selected color is associated with a type of special effect property.

17. The computer program product of claim 16, wherein the pattern file comprises an array of values, wherein each value in the array assigns a particular intensity of a selected color to a specific location in the pattern.

18. The computer program product of claim 17, further comprising computer readable program code which displays the special effect pattern on the display device by illuminating a portion of the display device in accordance with the intensity values stored in the pattern file.

19. The computer program product of claim 17, wherein said computer readable means for mapping comprises:

computer readable program code which displays the image on the display device;

computer readable program code which displays the special effect pattern on the display device;

computer readable program code which overlays the displayed image and the displayed special effect pattern on the display device; and computer readable program code which maps the image to the pattern file by mapping the color intensity value associated with specific pixels on the displayed special effects pattern to corresponding pixels on the displayed image.

* * * * *